Patented Apr. 25, 1933

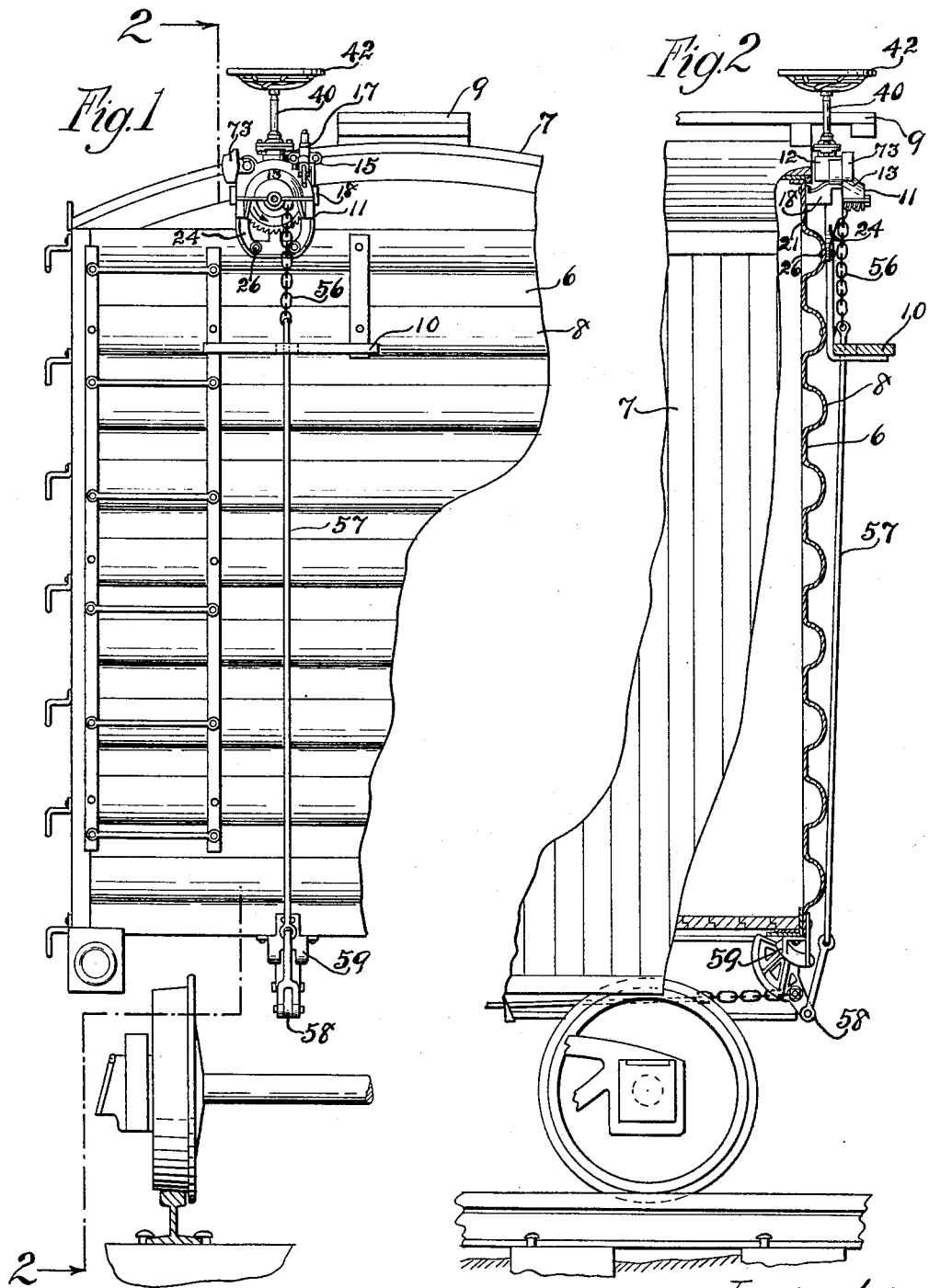

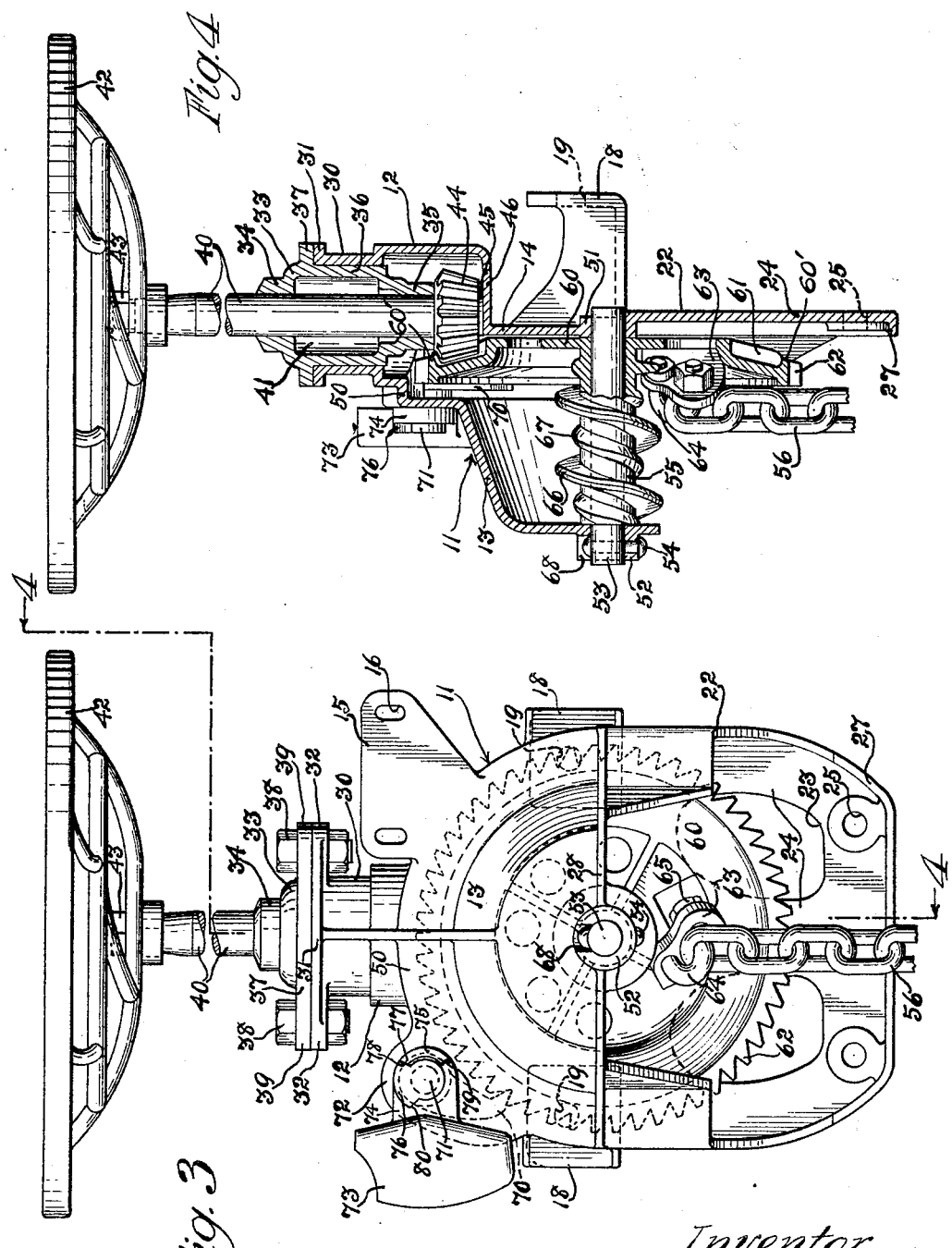
April 25, 1933.  A. F. KLASING  1,905,400
BRAKE MECHANISM
Filed July 24, 1930   2 Sheets-Sheet 2
Inventor
Augustus F. Klasing
by J. Daniel Stuwe
Attorney.

1,905,400

UNITED STATES PATENT OFFICE

AUGUSTUS F. KLASING, OF CHICAGO, ILLINOIS

BRAKE MECHANISM

Application filed July 24, 1930. Serial No. 470,367.

This invention relates to improvements in brake mechanisms; and more particularly to improvements in hand brakes for railway cars. It involves several improvements over the construction of brake mechanism disclosed in my patent on railway car hand brake, No. 1,749,948, dated March 11, 1930.

One of the prime objects of this invention is to simplify and expedite the mounting onto a railway car of both the pressure retaining valve and the upper brake unit of a hand brake mechanism, and to mount the same so as to greatly facilitate the operating of said valve and hand brake by the brakeman; and this I preferably accomplish by providing a unitary mounting means or frame for supporting said pressure valve and brake unit combined thereon, so that only one supporting means or frame need be secured onto the car wall and both the valve and brake will be grouped close together for convenient operation of either one or both thereof. Another object is to arrange the construction in this type of hand brake so that the brake staff can be readily removed and replaced, which becomes especially desirable in the event that it has been struck and bent. Still another object is to provide a supporting housing for a brake staff with a pinion fixed thereon, so that the staff and pinion are supported and protected therein and can also be readily removed therefrom and replaced. A further object is to provide housing means and to arrange the elements in this type of hand brake unit, so that the gear elements thereof will be protected against rain, snow, ice, dirt, etc. A still further object is to provide the brake staff mounting means with a grease pocket for automatically and continuously lubricating the bearing means on the staff for an extended length of time. Still another object is to provide a hand brake construction of this type wherein the elements are so arranged that the chain winding means will bring the chain nearer the longitudinal axis or center-line of the car, than in my above referred to patented construction, so as to enable the lower brake unit also to be placed nearer said center line and away from the car wheels, to avoid said lower unit being struck and injured by said car wheels during the rounding of curves and the like.

These and other objects and advantages are attained with this invention, as will become apparent from the following description, taken in connection with the accompanying drawings, in which,—

Fig. 1 is a partial end elevational view of a railway car with a brake mechanism which embodies my invention mounted thereon.

Fig. 2 is a vertical sectional view thereof, taken on line 2—2 of Fig. 1.

Fig. 3 is an end elevational view of this improved form of brake mechanism.

Fig. 4 is a vertical sectional view thereof, taken on line 4—4 of Fig. 3.

The drawings illustrate my invention in its preferred form of construction, and in Figs. 1 and 2 it is shown applied to a vertically extending wall, as the end wall or rear wall 6, of a railway car 7, said wall having corrugations or corrugated portions 8 extending rearwardly thereon. The brake mechanism is positioned at the required distance outwardly or laterally from the top platform 9 which extends over the car, above the longitudinal axis or center-line of said car, and at a suitable distance above the end platform or brake-step 10.

The illustrated form of my invention comprises a supporting mechanism or frame 11 for supporting thereon and mounting therewith the upper brake unit and the pressure retaining valve in juxtaposition. This frame is preferably of a unitary construction which comprises a combination housing including an upper sleeve-like housing portion 12 and an outer hood-like housing portion 13 which merges with said portion 12 and has a backing plate or rear plate 14 thereon from which said upper portion 12 arises.

The means for mounting the pressure retaining valve on this frame preferably comprises a vertically extending bracket or plate 15 which arises from the outer housing portion 13 and is provided with slots 16 for adjustably mounting thereon the pressure retaining valve 17, as indicated in Fig. 1 of the drawings.

The bracket means for mounting the frame on the car wall is in this form of my invention particularly arranged for mounting said frame on a corrugated end wall, and this bracket means therefore comprises rearwardly extending or inner bracket means, preferably in the form of a pair of angularly bent and flanged members or bracket arms 18 which extend rearwardly from the end parts of said backing plate 14, and having holes 19 therein for receiving suitable securing elements for securing said arms onto the inner or depressed wall part 21 of said rear wall. Depending bracket means 22 extend from plate 14, being substantially a downward continuation of said backing plate, but having portions cut-out therefrom at the lower part, as shown at 23 in Fig. 3, thereby lessening the weight of the frame, and providing depending bracket arms 24 which merge at the lower end and have holes 25 therein for receiving suitable securing elements 26 to secure said arms to one of the corrugated portions 8 of the end wall. A reinforcing flange 27 extends around the outer edge of said arms, and a reinforcing flange 28 extends along the outer edge of the outer housing portion 13.

The upper sleeve-like housing portion 12 includes a tubular part or cuff 30 which has an upper flange 31 with a pair of ears 32 thereon. A tubular casing member or cage 33 contains restricted bearing ends or necks 34 and 35 at its top and bottom ends, respectively, and an enlarged portion or body 36 therebetween, which is mounted in said cuff 30, said cage having an upper flange 37 resting on said flange 31 for supporting it in said upper housing portion, and it is removably secured in position by means of bolts 38 extending through suitable holes in ears 39 provided on said flange 37 and through similar holes provided in said ears 32 on flange 31.

A brake staff 40 is rotatably mounted in the ends 34 and 35 of cage 33, and the enlarged intermediate portion 36 of the cage provides a grease pocket 41 for storing hard grease therein, to automatically and continuously lubricate the brake staff for an extended length of time. A hand wheel 42 is removably mounted on the upper end of the staff, with a nut 43, and a gear 44 is provided on the lower end of the staff, being preferably in the form of a bevel pinion and integral with the staff. The lower end of the pinion and staff are supported and bear rotatably upon the top face of a supporting projection or boss 45 provided on a horizontal bottom wall or part 46 of the upper housing portion 12, directly above the backing plate 14 and the depending bracket means 22, as best shown in Fig. 4, thereby providing a firm support for the brake staff. Said boss is preferably formed integral with said housing part 46, and with this arrangement for supporting the staff no further supporting elements are needed therefor, as was required in my above referred to patented construction and in similar ones, thus simplifying and decreasing the cost of the present brake mechanism; furthermore, the integral construction of the pinion with the staff enables the use of a smaller pinion, and consequently also of a smaller coacting gear wheel, thereby further decreasing the weight and the cost of this construction over those now in the market.

The outer hood-like housing portion 13 includes an inner arcuate portion 50, of greater radius than the main outer portion, whereby it is merged with the lower front part of the upper housing portion 12. Inner and outer supporting sleeves 51 and 52 are provided respectively, in the backing plate 14 and in the front or outer end of said housing portion, for mounting therein a shaft 53 which is held stationary by a pin or rivet 54 and whereon is journaled a spiral drum 55 for winding the chain portion 56 of the power transmitting means 57 which connects the upper brake unit operatively with the bell-crank 58 of the lower brake unit 59 mounted at the lower rear end of the car, and which is more fully disclosed and claimed in my patent above referred to.

A gear wheel 60 is provided on the inner end of the spiral drum, and it is preferably made integral therewith, to simplify the construction. This gear wheel is preferably arranged to provide a bevel gear having its teeth 61 directed inwardly, in mesh with the teeth of bevel pinion 44 on staff 40. It is also provided with ratchet teeth 62, which extend radially outwardly from a rim or peripheral portion 60' of wheel 60, beyond the diameter of the bevel gear and its teeth 61. This portion 60' projects laterally over teeth 61, providing flange means extending also over the teeth of pinion 44; thereby aiding cage 33 in preventing upward movement of said pinion away from said gear wheel. A lug 63 extends at a slant outwardly from the bevel gear and is integral therewith, and a U-bolt 64 engages in the upper link of chain portion 56 and has its arms extending through holes provided in said lug, being removably held on the lug by nuts or elements 65.

The drum is provided with a spiral chain guiding rib 66, and a spiral chain bearing rib 67 of smaller diameter than said rib 66. These ribs cause the chain to be wound outwardly on the drum, during the brake applying operation, and to bring the successive links alternately on the opposite sides of said bearing rib 67, so as to avoid distortion of the links, by the winding of the chain on the drum as the brakes are being applied, as more fully disclosed and claimed in my patent on winding mechanism, No. 1,749,949, dated March 11, 1930.

To facilitate removing the drum shaft 53 from its supporting sleeves 51 and 52, a notch 68 is provided in the outer sleeve 52 to extend around and outward of the upper head or end of retaining pin 54. After said pin has been withdrawn from shaft 53, as by removing the lower head of the pin and withdrawing it upwardly, a suitable punch or tool can then be inserted in the pin hole in the end of said shaft and the shaft withdrawn from the drum by working the punch and moving it outwardly in said notch 68.

A pawl 70 is provided for engaging ratchet teeth 62 of gear wheel 60 and to retain the wheel and drum stationary. The pawl is mounted on and turns with a shaft 71 which is rotatably mounted in suitable bracket means 72 arising from the arcuate part 50 of the housing. A weight 73 has a side lug or ear 74 with a suitable opening therein through which the pawl shaft 71 extends, and whereby said weight is enabled to swing on said shaft. Said lug has an arcuate rib or ridge 75 at its end, and said shaft has a segmental stop shoulder 76 on its outer end or head.

The pawl is held in its operative position, in engagement with ratchet teeth 62, when the weight is swung outward, as best shown in Fig. 3 of the drawings, and the upper end 77 of said arcuate rib 75 engages the inner end 78 of said shoulder 76. When the weight is swung over toward the upper housing portion 12, the lower end 79 of said rib engages the outer end 80 of said shoulder 76, and swings the pawl away and free from said ratchet teeth, as further disclosed and claimed in my patent on winding means, No. 1,749,950, dated March 11, 1930.

The above disclosed arrangement of the gear elements and the housing portions and associated parts of the brake mechanism, protects the inwardly extending gear teeth 61 of the bevel gear from rain, sleet, snow, ice, dirt, etc.; and by turning the hand wheel 42 in the customary and established clock-wise direction, the gear wheel 60 is turned counter-clock-wise and in the direction of the arrow shown in Fig. 1, thereby winding the chain on the drum and drawing it upwards on that side of the drum which is nearest to the platform 9 and to the longitudinal center-line or axis of the car; and since the upper brake unit and the brake staff must remain a certain minimum distance at least away from said center-line or axis, this disclosed arrangement of elements enables the lower brake unit with its bell-crank to be mounted nearer said longitudinal center-line and farther away from the wheels of the car, and yet provide a straight upward pull by said chain on the bell-crank and the lower brake unit, as best indicated in Fig. 1, and avoid having said bell-crank or lower unit struck and damaged by the wheels of the car during the rounding of curves and the like. The brake staff and the pinion thereon are also readily removable from the housing, preferably by removing the pair of bolts 38, then sliding cage 33 upwards, out of collar 30 of the housing portion 12, and then by slightly tilting the staff so as to remove the teeth of pinion 44 from under the peripheral flange means 60' of gear wheel 60, withdrawing the staff with the pinion 44 from the housing portion 12; then by removing nut 43 and hand wheel 42, the staff can be slid down out of the cage, and replaced with an undamaged staff and pinion thereon.

I claim as my invention:

1. In a brake mechanism for a railway car having a wall with outwardly projecting corrugations, supporting means including integral bracket means comprising inner bracket means including horizontal arms having vertical end portions for securing to the car wall and lower depending bracket means securable to a corrugation, integral housing means on said supporting means, including an upper sleeve-like portion having its axis directly above said depending bracket means for carrying the brake staff with a pinion on its lower end, said housing means also including an outer housing portion for carrying the brake drum and an arcuate portion whereby said outer portion is merged with said upper portion and for housing and protecting a gear member to mesh with said pinion positioned at the inward side thereof.

2. In a brake mechanism for a railway car having an end wall with a corrugated portion, supporting means comprising bracket means including inner bracket arms securable to the car end and depending bracket arms securable to the corrugated portion, integral housing means on said supporting means and comprising an upper sleeve-like portion positioned over said bracket arms for carrying the brake staff with a pinion, also an outer hood-like housing portion extending outwardly from said arms for carrying the brake drum and having an arcuate enlarged portion whereby it merges with the front of said upper portion and for housing a gear which has bevel teeth extending inwardly and meshing with the outer side of said pinion, and a bracket plate arising integral from said arcuate portion for carrying thereon a pressure retaining valve.

3. In a railway car brake, a housing comprising an upper inner sleeve-like portion and an outer hood-like portion having an enlarged arcuate part whereby it is merged with the front part of said upper portion, bracket means inwardly of said outer portion and below said upper portion for mounting the housing on the car wall, a brake staff having a bevel pinion integral with its lower end, means for mounting said staff vertically in said upper portion and removable therefrom with the pinion, a chain winding drum and means for journaling it in said outer housing portion, and a bevel gear on said drum to rotate therewith and having its teeth directed inwardly in mesh with said pinion, said gear teeth being thereby protected in said arcuate part and the housing against rain, snow, and ice.

4. In a railway car brake, a housing having means for mounting it on a car wall and comprising a tubular upper portion for encasing a brake staff having a pinion on its lower end, cage means in said tubular portion for rotatably embracing said staff, said cage means having a restricted upper neck embracing said staff and also having flange means extending outwardly over said housing portion, to prevent moisture from entering said cage means and housing, and means for mounting said flange means on said housing portion for quickly removing and replacing said staff and pinion together from said housing portion and from said cage means.

5. In a railway car brake, a housing having means for mounting it on a car wall and comprising a tubular upper portion and a brake staff therein having a pinion on its lower end, tubular means in said tubular portion for rotatably embracing said staff, said tubular means having its lower part engaging said pinion for retaining it in position and having its upper part embracing said staff and provided with means for extending outwardly over said tubular upper portion, to prevent moisture from entering said tubular means and housing, and means for mounting said tubular means on said tubular portion to enable ready removal of said means and staff and pinion from said upper portion.

6. In a railway car brake, a housing comprising an upper tubular portion and an outer hood-like portion merging with the front part thereof, bracket means on the inward wall part of said outer portion for mounting the housing on a car wall, a brake staff having a pinion on its lower end rotatably supported on the lower part of the upper tubular portion directly above said wall part, means embracing said staff for rotatably mounting it with the pinion in said tubular portion to facilitate ready removal of the staff and pinion therefrom, and a chain winding member having a bevel gear on its inner end and journalled in the outer hood-like portion, said gear having its face positioned against said inward wall part and its teeth being directed inwardly in mesh with the teeth of said pinion, thereby protecting the teeth of said gear in said housing against rain, snow and ice.

7. In railway car brake, a housing having means for mounting it on a vertically extending wall of a car, said housing including a tubular outer portion and an upper portion merging with said outer portion, a chain winding member having a gear wheel on its inner end journaled in said outer portion, a vertical brake staff and a pinion on its lower end for actuating said gear wheel, a boss in said upper portion for bearing said pinion and staff thereon, and means including a tubular member which rotatably embraces said staff and engages said pinion, for journaling said staff and pinion in said upper portion to facilitate ready removal and replacement thereof.

8. In a railway car brake, a housing having means for mounting it on a car wall and comprising a tubular upper portion, a tubular cage having an enlarged body portion and restricted end portions mounted in said upper portion, readily releasable means for securing said cage in said housing, and a brake staff journaled in said end portions, said enlarged body portion providing a grease pocket for storing grease therein to lubricate said staff in said end portions.

9. In a railway car brake, a housing having means for mounting it on a car wall and comprising a tubular upper portion having a collar thereon, a tubular cage having restricted bearing portions at its ends and having an enlarged intermediate portion mounted in said collar and providing a grease pocket for storing lubricant therein, a brake staff journaled in said bearing portions and carrying a pinion fixed on its lower end beneath said cage, and means on said cage and said upper portion for releasably securing them together, whereby said cage is slidably removable from said collar and thereupon the staff and pinion are readily removable from said cage and replaceable.

10. In a raliway car brake, a housing mountable on the car and including an inner bearing sleeve and an outer bearing sleeve, the latter containing a notch, a shaft mounted in said sleeves and having a hole at its end to extend down from said notch, a drum removably mounted on said shaft, and a pin in said hole to secure said shaft in said sleeves and having a head positioned in said notch, said pin being withdrawable from said shaft to enable a tool to be inserted through said notch into said hole for prying said shaft loose from said sleeves.

11. In a railway car brake, a lower brake unit mounted adjacent the lower edge of an end wall and sideways of the longitudinal axis of the car, an upper brake unit mounted adjacent the upper edge of said end wall, over said lower unit, and including a housing and a drum therein having its axis extending outwardly from the car wall, a gear on the inner end of said drum having its gear teeth directed inwardly toward said end wall, flexible power transmitting means connecting said lower and upper brake units and being windable on said drum, and a brake staff and pinion mounted in said housing at the inner side of and in mesh with said teeth, to operate the drum so that during the brake applying operation said flexible means will be drawn upwardly on that side of the drum which is nearest said longitudinal axis of the car, thereby providing for mounting said lower brake unit nearer the center of said lower edge and out of reach of the wheels of the car.

12. In a railway car brake, a housing including a tubular portion and means for mounting it on the wall of a car, a vertically extending brake staff, tubular means mounted in said housing portion and having means including a lower bearing sleeve for journaling said staff within said portion, means on said tubular portion and on said tubular means for securing them together for convenient separation thereof, means in the lower part of said housing portion provided with an upper bearing face, and a pinion fixed on the lower end of said staff to rotatably bear on said face and being confined between said bearing face and said bearing sleeve to prevent excess vertical movement of said pinion and staff.

13. In a railway car brake, a housing mountable on the car and including inner bearing means and outer bearing means, the latter containing a notch, a shaft mounted in said bearing means, a drum removably mounted on said shaft, and a securing member having a portion engaging in said shaft and having a portion positioned in said notch, for securing said shaft in said bearing means, whereby said securing member is withdrawable from said shaft to enable a tool to be inserted through said notch into said shaft in place of said member for prying the shaft loose from said bearing means.

In testimony whereof I have signed my name to this specification.

AUGUSTUS F. KLASING.